United States Patent
Hanschu et al.

(10) Patent No.: US 6,452,403 B1
(45) Date of Patent: Sep. 17, 2002

(54) TEST APPARATUS FOR VEHICLE INTRUSION ALARM

(75) Inventors: Loretta F. Hanschu, Westland; Edmond Van Elslander, Warren; Hans Johnson, Royal Oak; Ronald R. Davenport, Ypsilanti; Michael P. Dotz, Saline, all of MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/521,830

(22) Filed: Mar. 9, 2000

(51) Int. Cl.[7] .............................................. H01H 31/02
(52) U.S. Cl. .................................... 324/555; 324/158.1
(58) Field of Search ................................. 324/537, 754, 324/555, 158.1; 340/426, 516, 515, 635, 648, 901, 943, 429, 541, 544; 73/1.82, 1.79, 1.01

(56) References Cited

U.S. PATENT DOCUMENTS

| | | | | |
|---|---|---|---|---|
| 1,290,449 A | * | 1/1919 | Widerberg | |
| 3,947,838 A | * | 3/1976 | La Forge, Jr. | 340/276 |
| 5,109,216 A | * | 4/1992 | Yarbrough et al. | 340/544 |
| 5,166,681 A | * | 11/1992 | Bottesch et al. | 340/933 |
| 5,192,931 A | * | 3/1993 | Smith et al. | 340/550 |
| 5,457,438 A | * | 10/1995 | Ziegler | 340/426 |
| 5,606,256 A | * | 2/1997 | Takei | 324/207.21 |
| 5,677,666 A | * | 10/1997 | Stallbohm | 340/426 |
| 5,729,193 A | * | 3/1998 | Grasmann et al. | 340/426 |
| 5,856,778 A | * | 1/1999 | Kani et al. | 340/426 |
| 6,046,893 A | * | 4/2000 | Heravi | 361/23 |
| 6,062,079 A | * | 5/2000 | Stewart | 73/488 |
| 6,262,550 B1 | * | 7/2001 | Kliman et al. | 318/565 |

OTHER PUBLICATIONS

Performance Test Specifications, published 1996 or earlier.
Performance Test Specifications, published 1996, MIRRC Issue 2.

* cited by examiner

Primary Examiner—Michael Sherry
Assistant Examiner—Anand R Amin
(74) Attorney, Agent, or Firm—Tarolli, Sundheim, Covell, Tummino & Szabo L.L.P.

(57) ABSTRACT

A vehicle (12) includes an ultrasonic intrusion alarm system (11). A linear electric motor (60) has a movable part (64) that moves linearly relative to the alarm system (11) upon actuation of the linear electric motor. A computer (120) controls operation of the linear electric motor (60). A plurality of different test devices (80, 90, 100, 110) are selectively connectable with the movable motor part (64) for performing different tests of the alarm system (11).

11 Claims, 4 Drawing Sheets

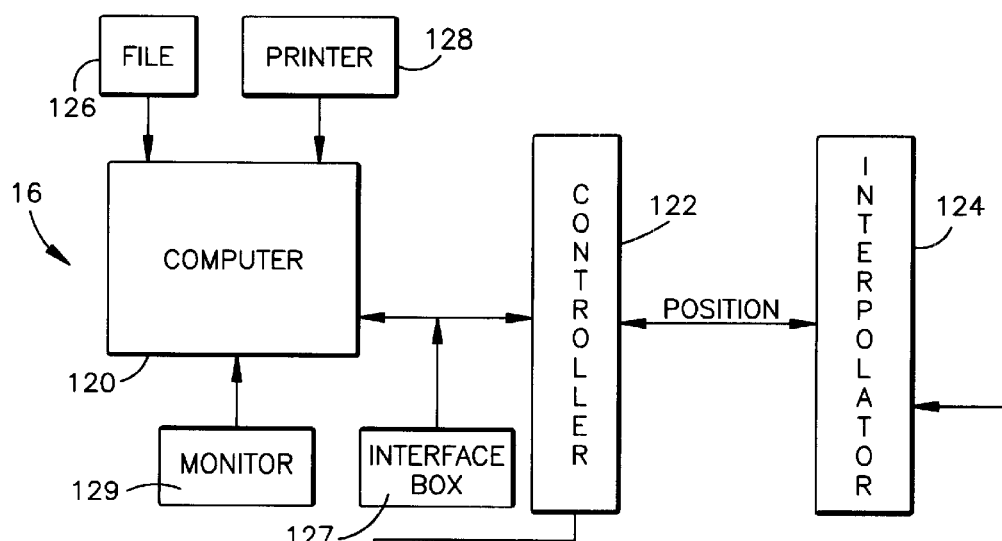
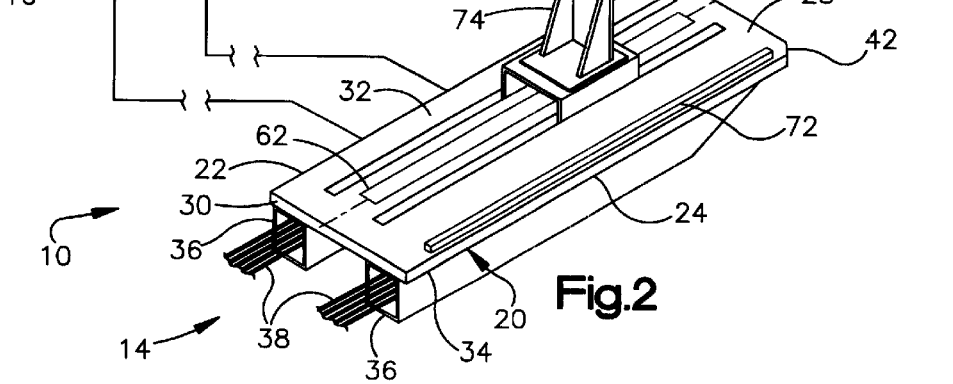
Fig.1
Fig.2

TEST APPARATUS FOR VEHICLE INTRUSION ALARM

BACKGROUND OF THE INVENTION

1. Technical Field

The present invention relates to a vehicle intrusion alarm and, in particular, relates to an apparatus for testing an ultrasonic intrusion alarm system of a vehicle.

2. Description of the Prior Art

One type of vehicle alarm system uses ultrasonic waves generated within the passenger compartment of a vehicle to detect an unauthorized intrusion or impact to the vehicle. In some governmental jurisdictions, such an alarm system must meet performance standards set by government regulation. The regulations set forth tests that such an alarm system must pass in order to be certified.

One known apparatus for testing an alarm system includes a half rubber sphere mounted to a ram. An adjustable spring pushes on the ram to impart. energy to the ram. An electric motor and cam assembly compresses the spring by pulling back the ram and then releasing it, at 2 cycles per second, as required by an impact test.

SUMMARY OF THE INVENTION

The present invention is an apparatus for testing an ultrasonic intrusion alarm system of a vehicle. The apparatus includes a linear electric motor having a movable part that moves linearly relative to the alarm system upon actuation of the linear electric motor. The apparatus includes a computer for controlling operation of the linear electric motor. A plurality of different test devices are selectively connectable with the movable motor part for performing different tests of the alarm system. The apparatus also includes means for connecting a selected one of the plurality of different test devices for linear motion with the movable motor part relative to the alarm system to perform one of the tests.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 1 is a functional block diagram of a test apparatus constructed in accordance with the present invention;

FIG. 2 is a schematic perspective view of the test apparatus of FIG. 1 shown in a condition for performing a first test of an alarm system of a vehicle;

DESCRIPTION OF A PREFERRED EMBODIMENT OF THE INVENTION

Figure 3:
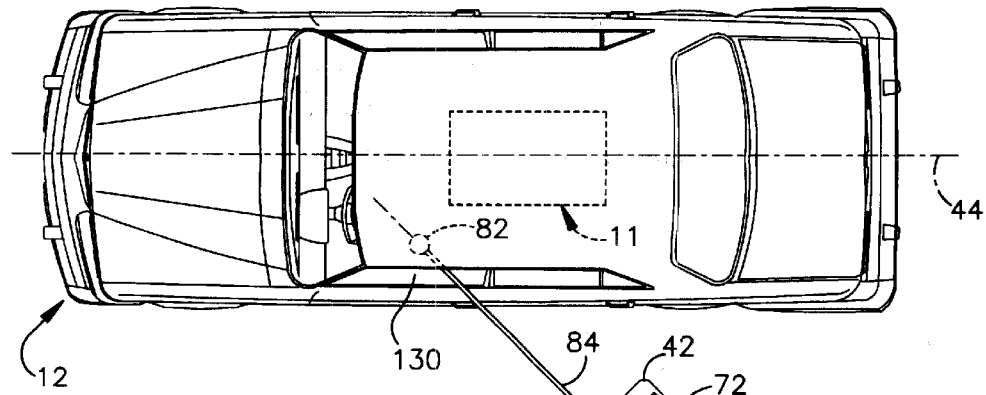
FIG. 3 is a view similar to FIG. 2 showing a stage in the first test.

The present invention relates to a vehicle intrusion alarm and, in particular, relates to a test apparatus for testing a vehicle ultrasonic intrusion alarm system. The present invention is applicable to various test apparatuses. As representative of the present invention, FIG. 1 illustrates a test apparatus 10 usable to test an ultrasonic intrusion alarm system, indicated schematically at 11, of a vehicle 12. The alarm system 11 uses ultrasonic waves generated within the passenger compartment of the vehicle 12 to detect an unauthorized intrusion into the vehicle, or impact to the vehicle.

The test apparatus 10 includes a platform assembly 14 for conducting the mechanical aspects of the test, and electronic circuitry indicated schematically at 16 for operating the platform assembly and for analyzing the results of the tests.

The platform assembly 14 includes a base or platform 20 that has a generally box-shaped configuration including sides 22 and 24 that extend parallel to a central axis 26 of the platform. Parallel front and back ends 28 and 30 of the platform 20 extend perpendicular to and interconnect the sides 22 and 24. The platform 20 has planar upper and lower major side surfaces 32 and 34.

The platform assembly 14 includes channels 36 on the lower side surface 34 of the platform 20, for receiving forks 38 (shown partially) of a fork lift truck. The platform assembly 14 is thus movable, by a fork lift truck, relative to the vehicle 12. Alternatively, the platform assembly 14 can be externally movable in some other manner, or can be self-propelled.

The platform assembly 14 can be moved laterally relative to the vehicle 12; can be positioned vertically relative to the vehicle; and can be turned at an angle relative to the vehicle. The front corners 40 and 42 of the platform 20 are cut away at an angle of 45 degrees to the axis, to enable the platform assembly 14 to be placed close to the vehicle 12 at a 45 degree angle to the front to back centerline 44 (median) of the vehicle.

It should be understood that the platform 20 need not have the generally rectangular configuration shown in the drawings, but can instead have any configuration or be any structure suitable for supporting the linear motion system 50 described below and for moving it relative to the vehicle 12 and the alarm system 11 as noted herein.

The test apparatus 10 includes a linear motion system 50 on the upper side surface 32 of the platform 20. The linear motion system 50 includes a linear electric motor 60. The linear electric motor 60 includes a fixed motor part 62 in the form of a magnet structure that is fixed to the upper side surface 32 of the platform and that extends in a direction along the axis 26. The fixed motor part 62 may be a permanent magnet structure or an electromagnet structure.

The linear electric motor 60 also includes a movable motor part 64. The movable motor part 64 is supported for linear sliding movement along a pair of rails 66 and 68. The movable motor part 64 is movable, when energized, along a line of linear motion 70 that extends parallel to the rails 66 and 68 and the axis 26.

The linear motion system 50 includes an encoder 72 that extends alongside the rail 68. The encoder 72 is operative in a known manner to provide an output signal to the electronics 16 that is indicative of the position of the movable motor part 64 along the line of linear motion 70.

The linear motion system 50 also includes a fixture support table 74 that is fixedly mounted on the movable motor part 64. The fixture support table 74 is movable along the platform 20, with the movable motor part 64, along the line of linear motion 70. The fixture support table 74 is adapted to receive and support any one of a plurality of test objects or test fixtures 80, 90, 100 and 110.

One of the test fixtures 80 includes a 100 mm diameter ball 82 mounted on a distal end portion 84 of a rod 86. The proximal end portion 88 of the rod 86 is connectable with the fixture support table 74. Another one of the test fixtures 90 (FIG. 8) includes a square metal plate 92 having sides of one meter in length. A rod 94 connected with the metal plate 92 is connectable with the fixture support table 74.

Another test fixture 100 (FIG. 4) includes a small, rectangular metal plate 102 having sides of 0.2 meters by 0.15 meters. The metal plate 102 is supported on a rod 104 that is connectable with the fixture support table 74. The fourth test fixture 110 (FIG. 5) is a hemispherical impact head 112 that has a mounting rod 114 connectable with the fixture support table 74.

The electronics 16 includes a computer 120 in which the various test programs are stored. The computer 120 is operative to control a motor controller 122 that provides an electric current to the linear electric motor 60 having an appropriate polarity and level for the desired motor movement. An interpolator 124 receives signals from the encoder 72 and outputs a position signal to the controller 122. The results of the test can be saved to a file 126, printed to a printer 128, or displayed on a monitor 129.

The computer 120 communicates directly with the motor controller 122 via an RS-232 port connection. The computer 120 also communicates with the motor controller 122 through an interface box 127. The computer 120 has a digital I/O card that is connected to the interface box 127. The interface box 127 is connected to the controller 122 via digital I/O ports on the controller. Thus, the computer 120 can communicate digitally with the motor controller 122 through the interface box 127, to control the functions of the controller.

The interface box 127 has manually operable controls which enable the user to manually control the functions of the motor controller 122 via the digital I/O ports on the controller. The interface box 127 also allows the user the option to control the motor 60, through the computer 120, via the user interface offered by the computer display 129 and mouse/keyboard inputs. Finally, the interface box 127 also allows connection of the intrusion alarm system's alarm output to the computer 120, for capturing alarm state changes using the computer's digital input connections.

The linear motion system 50 is operable to effect movement of the fixture support table 74 along the line of linear motion 70, relative to the platform 20, while the platform is stationary relative to the vehicle 12. Specifically, the linear electric motor 60 is energizable to move the fixture support table 74 along the platform 20, relative to the vehicle 12, between a fully retracted position at or near the back end 30 of the platform; a fully extended position at or near the front end 28 of the platform; and any position in between. Low friction bearings enable small, precise movements of the movable motor part 64 along the line of linear motion 70 and thus enable accurate placement of the fixture support table 74 relative to the platform 20 without moving the platform relative to the vehicle 12.

FIG. 3 illustrates the use of the test apparatus 10 to conduct a ball detection performance test in accordance with test standards set in Thatcham 10.2.2.1. In this test, a ball 82 millimeters in diameter is moved a distance of 0.3 meters ±0.01 meters into the vehicle. The ball is moved in a direction of 45 degrees to the vehicle centerline 44 and parallel to the ground. Five attempts are made, at two different speeds, specifically, 0.15±0.02 meters per second and 1.5±0.1 meters per second. The test is passed if the alarm system detects the intrusion in three out of five attempts.

To conduct this test, the proximal end portion 88 of the rod 86 of the test fixture 80 is attached to the fixture support table 74. The platform assembly 14 is then moved by the fork lift truck into a test position adjacent to the vehicle 12.

Specifically, the platform assembly 14 is positioned laterally so that the ball 82 is immediately outside a window opening 130 of the vehicle 12, that is, at the starting point for the required amount of movement. The platform assembly 14 is positioned vertically so that the ball 82 can be moved, in a direction parallel to the ground, through the window opening 130. In addition, the platform assembly 14 is aligned relative to the vehicle 12 so that the line of linear motion 70 extends at a 45 degree angle to the median 44 of the vehicle. The operator may use one of the 45 degree cutaway corners 40 and 42 of the platform 20 to help align the platform assembly 14 at the required 45 degree angle.

When the platform assembly 14 is in the test position, the amount of linear motion provided by the linear motion system 70, taking into account the length of the rod 86 and how far the rod overhangs the platform 20 when extended, is sufficient so that the ball 82 can be moved far enough into the vehicle passenger compartment to complete the test without further moving the platform 20.

The starting position of the fixture support table 74 on the platform 20 is first noted in the electronics 16. This position is derived from the starting position of the movable motor part 64 relative to the fixed motor part 62, as determined by the encoder 72. The starting position of the ball 82 relative to the vehicle 12 is also noted.

Once the platform assembly 14 is set roughly in position near the vehicle 12, the motor 60 can be used to move the ball 82 into the desired starting position, without having to move the entire platform assembly 14. Specifically, the linear motion system 50 is actuatable to move the test fixture 80 on the platform 20 between an initial position farther from the vehicle 12 than the predetermined starting position, the predetermined starting position, and a testing position spaced apart closer to the vehicle.

The linear electric motor 60 is energized to conduct the test. The electronics 16 is programmed to control the linear electric motor 60 to move the ball 82 through the window opening 130, at a constant speed, into the passenger compartment of the vehicle 12. The ball 82 is moved along the line of linear motion 70, parallel to the ground surface and at a 45 degree angle to the median 44 of the vehicle 12.

The output of the encoder 72 is used to determine the position of the ball 82 at any time relative to the platform 20. Thus, it is possible to determine and record the position of the ball 82 relative to the vehicle 12, at any time during the test.

The output of the alarm system 11 is transmitted to the electronics 16 so that the position of the motor 60 and therefore the ball 82, is noted on the monitor 129 when the alarm system is triggered. Thus, the position of the ball 82 is indirectly derived from the sensed motor position, rather than directly measured. This has the benefit of having a record in the computer file 126 and/or printed by the printer 128, of the motion and position of the ball 82 in each test attempt.

Figure 4:
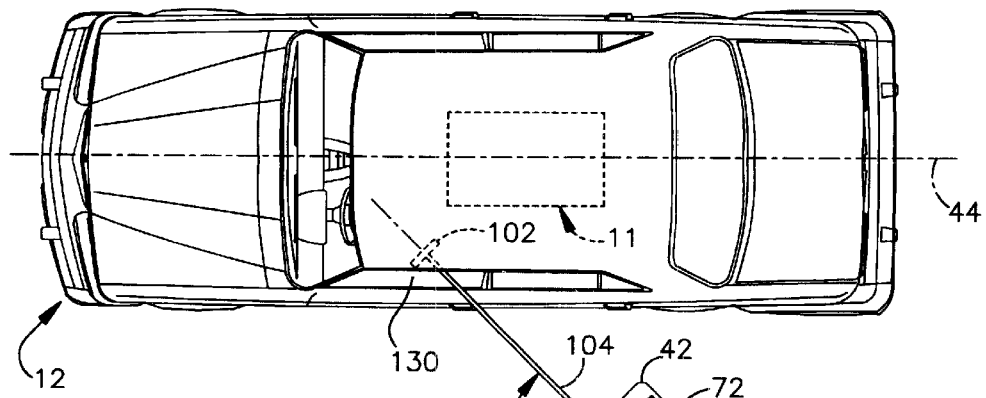
FIG. 4 is a view similar to FIG. 2 showing the test apparatus of FIG. 1 in a condition for performing a second test of the alarm system.

The other tests that are conducted with the test apparatus 10 are similar in nature and are, therefore, described in somewhat less detail. The standards for the test illustrated in FIG. 4 are set by EC 95/56 5.2.11. In this test, the rectangular plate or panel 102 measuring 0.2 meters by 0.15 meters is moved such that its center enters 0.3 meters into the vehicle 12 at a speed of 0.4 meters per second. The direction of movement of the panel 102 is 45 degrees to the vehicle centerline 44, and parallel to the ground.

The test fixture 100 is configured to perform this test when used in conjunction with the platform assembly 14 and the electronics 16. The test procedure is similar to that described above with reference to the first test fixture 80. The test fixture 100 is attached to the fixture support table 74. The platform assembly 14 is then moved by the fork lift truck into a test position adjacent to the vehicle 12, as with the first test described above. The motor 60 can initially be used to set the starting position of the plate 102, with the platform assembly 14 having been set in position only approximately relative to the vehicle 12.

When the platform assembly 14 is in the test position, the amount of linear motion provided by the linear motion system 50, taking into account the length of the rod 104 and how far the rod overhangs the platform 20 when extended, is sufficient so that the plate 102 can be moved far enough into the passenger compartment of the vehicle 12 to complete the test without further moving the platform.

The starting position of the fixture support table 74 on the platform 20 is first noted in the electronics 16. This position is derived from the starting position of the movable motor part 64 relative to the fixed motor part 62, as determined by the encoder 72. The starting position of the plate 102 relative to the vehicle 12 is also noted.

The linear electric motor 60 is then energized. The electronics 16 is programmed to control the linear electric motor 60 to move the plate 102 through the window opening 130, at a constant speed, into the passenger compartment of the vehicle 12. The electronics 16 considers the output of the encoder 72 to determine the position of the plate 102 at any time relative to the platform 20. Thus, the electronics 16 can determine where the plate 102 is, relative to the vehicle 12, at any time during the test. The output of the alarm system 11 is transmitted to the electronics 16 so that the position of the motor 60 and therefore the plate 102 is noted on the monitor 129 when the alarm system is triggered. The position of the plate 102 is indirectly derived from the sensed motor position, rather than directly measured.

Figure 5:
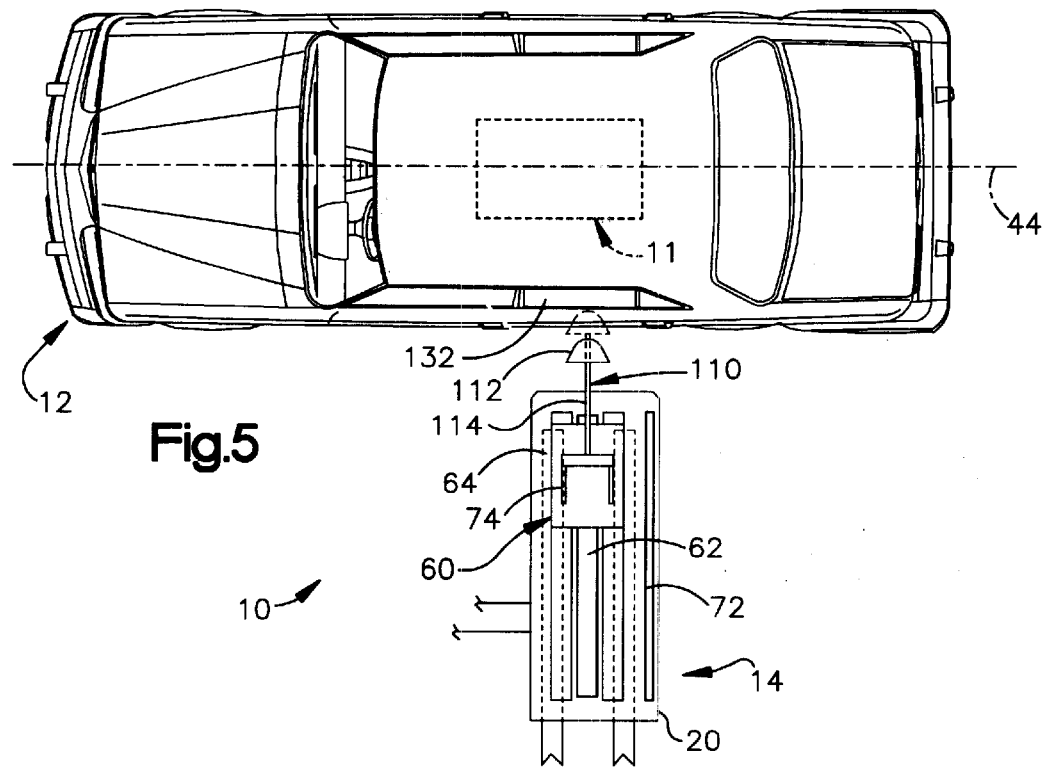
FIG. 5 is a view similar to FIG. 2 showing the test apparatus of FIG. 1 in a condition for performing a third test of the alarm system.

FIG. 5 illustrates use of the test apparatus 10 for a test of immunity to external impact on the vehicle 12. This test is described in Thatcham 10.2.2.4 and by EC 95/56 5.2.15. In this test, impacts of 4.5±0.5 Joules are applied at points around a vehicle. The impacts are in groups of 5 within an interval of 0.5 seconds between each impact.

This test is conducted using the test fixture 110 that includes the impact head 112. Under this test, the impact head 112 must be moved into engagement with the vehicle 12, withdrawn, and moved into engagement with the vehicle again, repeatedly and rapidly. This series of movements is accomplished by energizing the linear electric motor 60 to move forward (toward the vehicle 12), then reversing the motor to move the impact head 112 away from the vehicle, then forward again, as many times as is needed to complete the test.

The platform assembly 14 is first positioned by the fork lift truck with the impact head 112 approximately 60 millimeters, or more, from the vehicle window 132. The motor 60 is then used to position the impact head 112 exactly 60 millimeters from the window 132, without moving the platform 20 relative to the vehicle 12.

The linear electric motor 60 is energized and the movable motor part 64 is accelerated to a speed of 1.07 meters per second. The motor current is then dropped to a minimum, allowing the impact head 112 to coast into the window 132. The motor current is then reversed, bringing the test fixture 110 back to its starting position. This sequence is repeated every 500 milliseconds, allowing the impact head 112 to engage the vehicle window 132 with five impacts in the required time period of 2.5 seconds.

If the current supplied to the linear electric motor 60 is dropped to zero when changing the motor's direction, the motor 60 enters a "stall" mode in which it repositions itself. This takes about two seconds. Such a two second delay between impacts would make it impossible to complete the impact test. To avoid this problem, the electronics 16 is programmed to limit the current to the linear electric motor 60 but not drop it to zero altogether, prior to changing direction. Thus, the linear electric motor 60 never enters the "stall" mode and its position continues to be controlled by the electronics 16. This enables the rapid reversals of direction to be completed.

Figure 6:
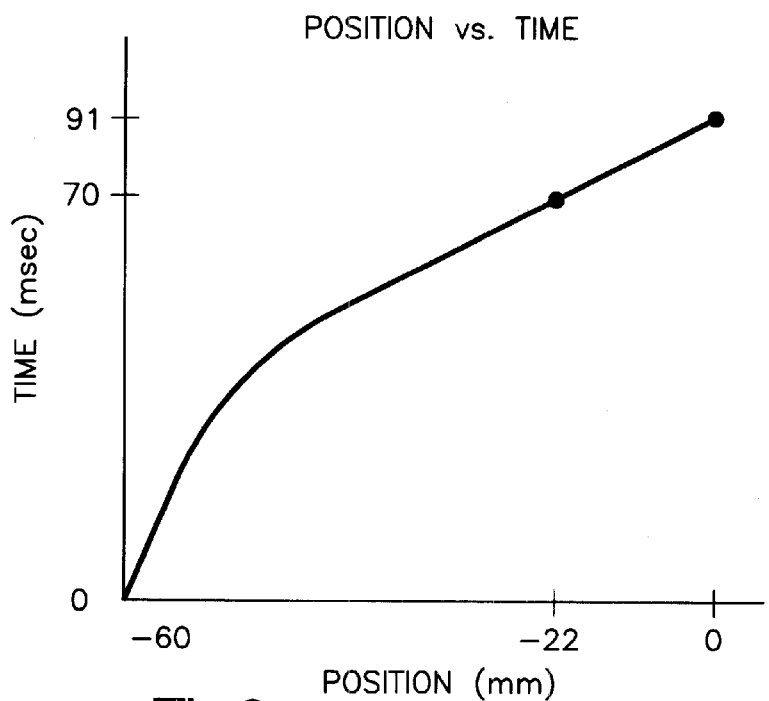
FIG. 6 is a graph showing motor position vs. time for the third test.
Figure 7:
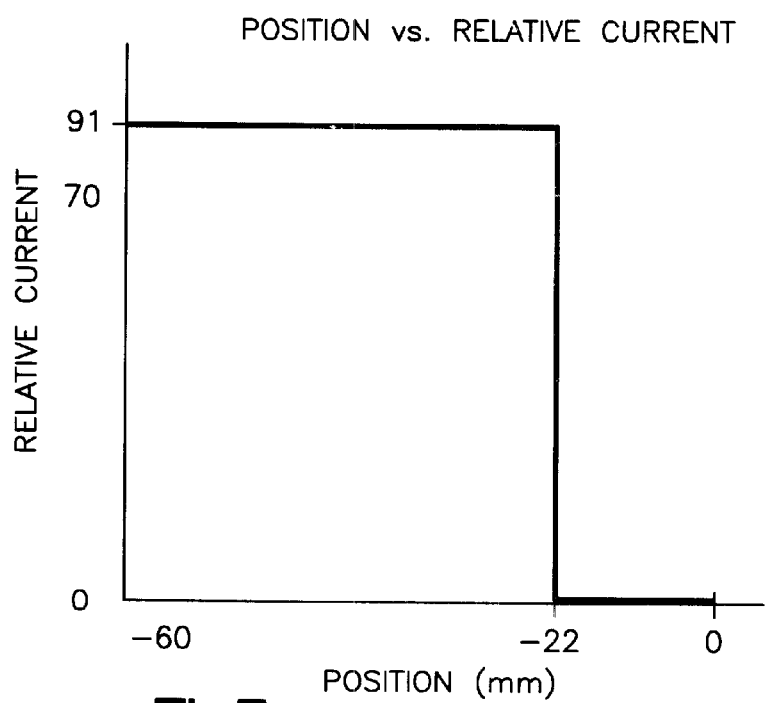
FIG. 7 is a graph showing motor position vs. current for the third test.

In this regard, FIG. 6 is a graph of position vs. time for the linear electric motor 60 in the impact test. FIG. 7 is a graph of current vs. position. It can be seen that a maximum relative current is applied for a period of 70 milliseconds. The current is then dropped, not to zero but almost to zero, for a further period of about 21 milliseconds. This occurs when the impact head 112 is at about 22 millimeters from the window 132. The impact head 112 is then moving about 1.07 meters per second. At this speed, the impact head 112 will reach the window 132 in about 21 milliseconds.

Another benefit of limiting the current to the motor 60 in this manner is that the impact head 112 is coasting when it contacts the vehicle 12. This can prevent the impact head 112 from engaging the vehicle 12 with so much force as to damage the vehicle, for example, breaking the vehicle window glass, as might occur were the impact head still being driven forward at the moment of impact.

Figure 8:
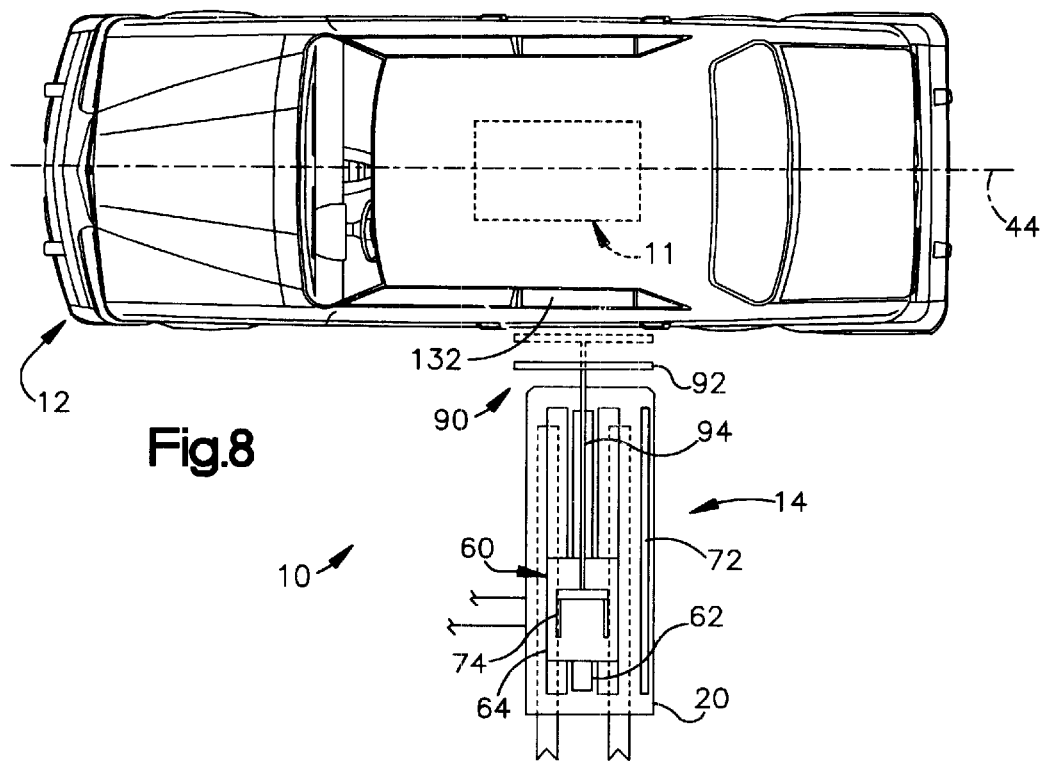
FIG. 8 is a view similar to FIG. 2 showing the test apparatus of FIG. 1 in a condition for performing a fourth test of the alarm system.

FIG. 8 illustrates use of the test apparatus 10 for an external movement immunity test. This test is specified in Thatcham 10.2.2.2. In this test, a square aluminum plate 92, 1 meter on a side, is placed one meter from the vehicle glass (outside the vehicle). The plate is moved toward the vehicle at a constant speed of 0.3±0.05 meters per second. The test is repeated at each glass area of the vehicle.

The test fixture 90 is configured to perform this test when used in conjunction with the platform assembly 14 and the electronics 16. The test procedure is similar to that described above. The proximal end portion of the rod 94 of the test fixture 90 is attached to the fixture support table 74. The platform assembly 14 is then moved by the fork lift truck into a test position adjacent to the vehicle 12. (The actual distance between the plate 92 and the vehicle 12 is shortened in FIG. 8).

The starting position of the fixture support table 74 on the platform 20 is first noted in the electronics 16. This position is derived from the starting position of the movable motor part 64 relative to the fixed motor part 62, as determined by the encoder 72.

The linear electric motor 60 is then energized. The electronics 16 is programmed to control the linear electric motor 60 to move the plate 92 toward the vehicle 12, at a constant speed. The encoder 72 determines the position of the plate 92 at any time relative to the platform 20. Thus, the electronics 16 can determine where the plate 92 is, relative to the vehicle 12, at any time during the test. Any output of the alarm system 11 is transmitted to the electronics 16 so that the operator can know exactly when the alarm system is triggered. Thus, the position of the plate 92 is indirectly derived from the sensed motor position, rather than directly measured.

From the above description of the invention; those skilled in the art will perceive improvements, changes and modifications in the invention. Such improvements, changes and modifications within the skill of the art are intended to be covered by the appended claims.

Having described the invention, we claim:

1. An apparatus for testing an ultrasonic intrusion alarm system of a vehicle, said apparatus comprising:

a linear electric motor having a movable part that moves linearly relative to the alarm system upon actuation of said linear electric motor;

a computer for controlling operation of said linear electric motor;

a plurality of different test devices selectively connectable with said movable motor part for performing different tests of the alarm system; and means for connecting a selected one of said plurality of different test devices for linear motion with said movable motor part relative to the alarm system to perform one of the tests.

2. An apparatus as set forth in claim 1 further comprising an indicator for indicating the results of the test of the alarm system, said computer being operative to indicate the position of said one test device relative to the alarm system during the test including at the time of triggering of the alarm system.

3. An apparatus as set forth in claim 1 further comprising a platform on which said linear electric motor is mounted, said platform being movable relative to the alarm system and the vehicle into a first position, said test device being movable by said linear electric motor relative to said platform and the vehicle without moving said platform relative to the vehicle.

4. An apparatus as set forth in claim 3 wherein said movable motor part supports any selected one of said plurality of different test devices for linear movement along said platform and relative to the alarm system and the vehicle without moving said platform out of the first position.

5. An apparatus as set forth in claim 1 wherein said plurality of different test devices includes a first test device positionable outside the vehicle to perform a first test of the alarm system and a second test device positionable inside the vehicle to perform a second test of the alarm system.

6. An apparatus as set forth in claim 5 further comprising a platform on which said linear electric motor is mounted, said platform being movable relative to the alarm system and to the vehicle into a test position, said first and second tests both being performed when said platform is in said test position.

7. An apparatus as set forth in claim 1 wherein said one of said plurality of test devices has a predetermined starting position relative to the vehicle for performing its associated test;

said linear electric motor being mounted on a platform movable into a first position relative to the vehicle;

said linear electric motor being actuatable to move said one of said test devices on said platform between a plurality of different positions relative to said platform and the vehicle without moving said platform out of said first position, said plurality of different positions including (a) an initial position spaced apart in a first direction from said predetermined starting position, (b) said predetermined starting position, and (c) a testing position spaced apart in a second direction opposite the first direction from said predetermined starting position.

8. An apparatus as set forth in claim 1 for performing one of the tests involving a reversal of direction of said linear electric motor, said apparatus comprising means for limiting the current to said linear electric motor during performance of said one of the tests to avoid a stall condition of said linear electric motor.

9. An apparatus for testing an ultrasonic intrusion alarm system of a vehicle, said apparatus comprising:

a platform movable relative to the alarm system and the vehicle into a test position;

a plurality of different test devices for performing the different tests of the alarm system; and a linear motion system to support any selected one of said plurality of different test devices for linear movement along said platform and relative to the alarm system and the vehicle without moving said platform out of said test position.

10. An apparatus as set forth in claim 9 wherein said linear motion system comprises a linear electric motor, said linear electric motor including a fixed motor part and a movable motor part, said movable motor part including a support for individually supporting said plurality of test devices for movement relative to said fixed motor part and thereby relative to said platform without moving said platform relative to the alarm system.

11. An apparatus as set forth in claim 10 for performing one of the different tests involving a reversal of direction of said linear electric motor, said apparatus comprising means for limiting the current to said linear electric motor during performance of said one of the tests to avoid a stall condition of said linear electric motor.

* * * * *